(12) United States Patent
Eisenbeiss (10) Patent No.: US 11,422,061 B2
(45) Date of Patent: Aug. 23, 2022

(54) TEST BENCH ARRANGEMENT FOR TESTING A MULTI-PLATE CLUTCH

(71) Applicant: ZF Friedrichshafen AG, Friedrichshafen (DE)

(72) Inventor: Jens Eisenbeiss, Fuerstenzell (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 440 days.

(21) Appl. No.: 16/613,895

(22) PCT Filed: Apr. 18, 2018

(86) PCT No.: PCT/EP2018/059803
§ 371 (c)(1),
(2) Date: Dec. 17, 2019

(87) PCT Pub. No.: WO2018/210512
PCT Pub. Date: Nov. 22, 2018

(65) Prior Publication Data
US 2020/0149992 A1    May 14, 2020

(30) Foreign Application Priority Data
May 17, 2017 (DE) ..................... 10 2017 208 311.5

(51) Int. Cl.
*G01M 13/04* (2019.01)
*F16D 25/0638* (2006.01)
*G01M 13/027* (2019.01)

(52) U.S. Cl.
CPC ......... *G01M 13/04* (2013.01); *F16D 25/0638* (2013.01); *G01M 13/027* (2013.01)

(58) Field of Classification Search
CPC .. G01M 13/04; G01M 13/027; G01M 13/025; G01M 13/022; F16D 25/0638
See application file for complete search history.

(56) References Cited

U.S. PATENT DOCUMENTS

| | | | | |
|---|---|---|---|---|
| 6,155,121 A * | 12/2000 | Ishida | ............... | G01M 13/028 73/862.41 |
| 6,923,049 B2 * | 8/2005 | Fujii | ............... | G01M 13/022 73/114.15 |
| 8,225,650 B2 * | 7/2012 | Ritschel | ............... | G01M 13/022 73/115.04 |

FOREIGN PATENT DOCUMENTS

DE    10 2010 011 158 A1    9/2011
DE    10 2010 055 573 A1    6/2012
(Continued)

OTHER PUBLICATIONS

German Search Report Corresponding to 10 2017 208 311.5 dated Jan. 26, 2018.
(Continued)

*Primary Examiner* — Freddie Kirkland, III
(74) *Attorney, Agent, or Firm* — Finch & Maloney PLLC; Jay S. Franklin; Michael J. Bujold (57) ABSTRACT

Friction disk sets of clutches and brakes are used, for example, in automatic transmissions. In clutch test benches for such clutches, the friction disks are held in a test chamber on inner and outer disk carriers. The test bench arrangement has a clutch unit which includes first and second disk carriers. The first disk carrier can be moved relative to the second disk carrier. A drive input section includes a drive input mechanism for producing relative movement between the first and the second disk carrier. A first driven shaft is mounted by at least one first bearing unit. The first disk carrier is drive-connected, via the first shaft, to the drive input mechanism. The first shaft is mounted to rotate by virtue of the first bearing unit. The test bench arrangement includes a measuring unit for determining a frictional torque of the first bearing unit.

16 Claims, 5 Drawing Sheets

(56) References Cited

FOREIGN PATENT DOCUMENTS

| | | |
|---|---|---|
| DE | 10 2012 009 139 A1 | 12/2012 |
| DE | 10 2014 213 220 A1 | 1/2016 |
| DE | 10 2015 209 915 A1 | 12/2016 |

OTHER PUBLICATIONS

International Search Report Corresponding to PCT/EP2018/059803 dated Jul. 2, 2018.
Written Opinion Corresponding to PCT/EP2018/059803 dated Jul. 2, 2018.
International Preliminary Report on Patentability Corresponding to PCT/EP2018/059803 dated Apr. 12, 2019.

* cited by examiner

TEST BENCH ARRANGEMENT FOR TESTING A MULTI-PLATE CLUTCH

This application is a National Stage completion of PCT/EP2018/059803 filed Apr. 18, 2018, which claims priority from German patent application serial no. 10 2017 208 311.5 filed May 17, 2017.

FIELD OF THE INVENTION

The invention relates to a test bench arrangement for testing a multi-disk clutch.

BACKGROUND OF THE INVENTION

Friction disk sets for clutches and brakes are used, for example, in automatic transmissions. In clutch test benches for such clutches the friction disks are held in the test chamber on so-termed inner and outer disk carriers. In such test benches the disk sets are subjected to testing in the test chamber, in which both the inner and outer disk carriers are moved in rotation.

The known test bench concepts for testing clutches have in common that a torque measurement at the input and/or output of the clutch is affected by the friction of the roller bearings of the test bench as an interfering parameter. The roller bearing friction is subject to marked variations and depends on a number of influencing factors such as rotational speed, exterior loading and the resistance of the lubricant, among others.

The document DE 102014213220A1 discloses a test bench arrangement for testing a multi-disk shifting element, which has a test bench frame with a drive unit for producing relative movement between disk carriers of the multi-disk shifting element and with an adjustment device for opening and closing the multi-disk shifting element, wherein a first disk carrier is connected directly to the driveshaft of the drive unit and a second disk carrier is supported rotationally fixed by means of a sensor element at least in order to detect a torque on the test bench frame.

From DE 10 2020 011 158 A1 a bearing test bench is known, for determining the frictional forces for dynamically loaded bearings. The bearing test bench comprises a driven test shaft and a test bearing in a bearing holder. By means of an external loading ring a predetermined force can be exerted on the test bearing for the production of a frictional torque between the test shaft and the test bearing. To determine the frictional forces occurring, a load cell is functionally connected to the bearing holder by way of a supporting lever.

From DE 10 2015 209 915 A1 a clutch test bench is known, for testing a clutch that has a disk set. The clutch test bench comprises a first and a second driven shaft arranged coaxially with one another, each of them being connected to a respective disk carrier of the disk set of the clutch arranged in a test chamber. The first and the second shafts are mounted in a common bearing element fixed on the housing.

DE 10 2010 055 573 A1 shows a test bench for determining the drag torque of a multi-disk clutch. The test bench comprises a first holding device which can be connected rotationally fixed to one of the disk sets and a second holding device which can be connected rotationally fixed to the other disk set, the first and the second holding devices being able to be rotated relative to one another by a drive unit. By means of a measuring device a drag torque between the disk sets can be determined.

SUMMARY OF THE INVENTION

The purpose of the present invention is to propose a test bench arrangement for testing a multi-disk clutch, which achieves greater test accuracy. This objective is achieved by a test bench arrangement having the characteristics specified in the claim(s).

Preferred or advantageous embodiments of the invention emerge from the subordinate claims, the description given below, and/or from the attached figures.

The object of the invention is a test bench arrangement designed and/or suitable for a multi-disk clutch. In particular, the test bench arrangement serves to simulate an operation of the multi-disk clutch and thereby to determine the behavior, for example the tribological properties, of the multi-disk clutch. Preferably, the test bench arrangement has the function of detecting a drag torque of the multi-disk clutch.

The test bench arrangement comprises a clutch unit, the clutch unit comprising a first disk carrier and a second disk carrier. In particular, the clutch unit can be in the form of a test chamber with the first and second disk carriers arranged inside the test chamber. For example the test chamber is filled with an oil sealed to prevent oil leaks. Preferably the first disk carrier is an inner disk carrier for holding inner disks and the second disk carrier is an outer disk carrier for holding outer disks, wherein in particular the outer and the inner disks are interleaved in alternation or arranged one after another in alternation. Alternatively however, the first disk carrier can be the outer disk carrier and the second disk carrier can be the inner disk carrier.

The first disk carrier can move relative to the second disk carrier. In particular, during operation of the test bench arrangement the first and/or the second disk carrier rotate(s) in a rotational direction about a rotational axis. Preferably, the first and/or the second disk carrier rotate(s) in an open condition of the clutch unit in the idling mode, so that in particular an idling torque or drag torque is produced.

As an optional supplement, the first and/or the second disk carrier can be displaced relative to one another in the axial direction in relation to the rotational axis, so that the clutch unit can be opened or closed. Preferably, in a closed condition of the clutch unit the two disk carriers are connected with one another in the rotational direction relative to the rotational axis, in particular by friction force, so that in particular a load torque is produced.

The test bench arrangement has a drive input section, this drive input section having a drive mechanism for producing the relative movement between the first and the second disk carrier. In particular the drive mechanism produces a drive torque or rotary movement so that the first and/or second disk carrier rotate(s) about the rotational axis. Preferably the drive mechanism is in the form of a drive motor, for example an electric motor.

The drive input section comprises a first, driven shaft such that the first disk carrier is in drive-connection by way of the first shaft with the drive mechanism. In particular, by way of the first shaft the drive torque from the drive mechanism is transferred to the first disk carrier so that in the open condition of the clutch unit the idling torque is applied at the first disk carrier and in the closed condition of the clutch unit the load torque is transmitted to the second disk carrier. Preferably, the first shaft is connected to the first disk carrier in a rotationally fixed manner.

As an optional supplement, the drive input section can comprise at least one compensating coupling and/or at least one torque sensor. The compensating coupling and/or the torque sensor is/are arranged between the first shaft and the drive mechanism, in particular with the drive mechanism coupled to the first shaft. Preferably, the torque sensor serves to detect the drive torque.

The drive input section comprises at least one bearing unit for mounting the first shaft, such that the first shaft is mounted to rotate by virtue of the first bearing unit. In particular the first bearing unit is in the form of a roller bearing, preferably a radial bearing or an oblique bearing.

In the context of the invention the test bench arrangement comprises a measuring unit for determining a frictional torque of the first bearing unit. In particular, the test bench arrangement comprises an evaluation device and the measuring unit and/or the torque sensor is/are connected for signaling purposes to the evaluation device. By means of the evaluation device, for example the frictional torque can be subtracted from the drive torque so that the actual torque, in particular the drag torque or the idling torque or the load torque of the clutch unit, in particular at the first or the second disk carrier, can be determined.

The advantage of the invention is that by determining the frictional torque of the bearing unit, a highly accurate measurement of small torques, especially the drag torque, can be made. Thus, by accurately determining the frictional torque the testing accuracy can be substantially improved, in particular by subtracting the frictional torque from the drive torque when determining the drag torque or the idling torque.

In a preferred embodiment of the invention the measuring unit comprises a sensor device and a hollow measuring shaft arranged coaxially with the driven shaft. for transmitting the frictional torque from the bearing unit to the sensor device. In particular, the sensor device is designed to detect the frictional torque or an alternative parameter. In principle the sensor device can be in the form of a further torque sensor which, for example, is connected to the hollow measuring shaft. Preferably however, the sensor device is in the form of a force sensor, and particularly when the hollow measuring shaft is rotating about the rotational axis in the rotational direction, a force acts on the sensor device in the rotational direction as the alternative parameter and is detected by the sensor device. In particular the sensor device is connected to the evaluation device so that in particular, on the basis of the alternative parameter, the evaluation device determines the frictional torque of the bearing unit.

The hollow measuring shaft is mounted on a first radial side by the first bearing unit and on a second radial side by a fluid bearing. In particular, the first bearing unit comprises at least one inner ring and at least one outer ring. The inner ring is preferably arranged on an outer circumference of the first shaft and the outer ring on an inner circumference of the hollow measuring shaft. In particular, by virtue of the fluid bearing a fluid film is produced, which is formed in a bearing gap between the hollow measuring shaft and a bearing block fixed to the housing. Preferably the fluid film is produced pneumatically or hydraulically. In particular, the bearing block is in the form of a hollow cylinder such that the bearing block encloses the hollow measuring shaft coaxially, at least in part.

Since at zero rotational speed the fluid bearing works in a frictionless manner, a precise determination of the frictional torque or friction of the bearing unit can be determined. A further advantage is in particular that the fluid bearing has good damping properties so that the test bench arrangement, particularly its drive input section, shows better operational behavior.

In a preferred embodiment of the invention the fluid bearing is in the form of a hydrostatic slide bearing. The fluid bearing can comprise a pump device for the production of an active fluid circuit. For example, the fluid film is a film of lubricant. In particular, in the axial direction and/or in the rotational direction relative to the rotational axis the bearing block has a plurality of inlet channels and fluid chambers. In particular the fluid chambers are in the form of lubricant pockets. The lubricant is preferably forced by the pump device through the inlet channels into the lubricant pockets, and thus into the bearing gap, so that the hollow measuring shaft and the bearing block are always kept apart from one another by a thin film of lubricant.

Alternatively, the fluid bearing is in the form of an aerostatic slide bearing. The fluid bearing can comprise a compressor device for the production of an air cushion. In particular, the fluid bearing is in the form of a nozzle-type air bearing or a sinter air bearing. For example, the fluid film is in the form of an air film. In particular, the fluid chambers can be air chambers. The air chambers serve, for example, to distribute the air uniformly and/or to increase the pressure in the bearing gap. The compressed air is preferably forced by the compressor device through the inlet channels and in particular by way of the air chambers into the bearing gap, so that the hollow measuring shaft and the bearing block are always kept apart from one another by a thin film of air.

In a further design version the hollow measuring shaft has a lever arm. In particular the lever arm is made rigid and extends outward in the radial direction relative to the rotational axis. The lever arm is preferably connected rotationally fixed to the hollow shaft, so that the frictional torque of the bearing unit can be transmitted directly from the hollow measuring shaft to the lever arm.

The lever arm is supported in the rotational direction about the rotational axis against the sensor device, so that rotation of the hollow measuring shaft in the rotational direction is impeded and the first frictional torque can be transmitted to the sensor device. In particular, when the hollow measuring shaft rotates in the rotational direction about the rotational axis a tensile force and/or a compression force is transmitted by the lever arm to the sensor device so that, for example on the basis of the force determined, the frictional torque can be determined.

In a first embodiment the second disk carrier is stationary, so that when the clutch unit is actuated a brake operation can be simulated. In particular, the first disk carrier rotates about the rotational axis during operation, whereas the second disk carrier remains stationary relative to the first disk carrier. In particular the second disk carrier is connected rotationally fixed to a housing of the test bench arrangement. During a closing process of the clutch unit, the second disk carrier comes into contact with the first disk carrier so that the first disk carrier is braked by friction force.

In a second embodiment the test bench arrangement comprises a drive output section, such that the drive output section comprises a drive output mechanism, a second driven shaft and at least one second bearing unit for mounting the second shaft. In particular, the drive output mechanism is in the form of a drive output motor.

The second disk carrier is drive-connected to the drive output mechanism by way of the second shaft. In particular, via the second shaft a drive output torque or the load torque is transmitted between the second disk carrier and the drive output mechanism.

The second shaft is mounted to rotate by virtue of the second bearing unit, so that by actuating the clutch unit a clutch operation can be simulated. Clutch operation means that the drive input and the drive output of the clutch can both rotate. If in clutch operation the clutch unit is closed, then the drive input mechanism and the drive output mechanism are synchronized to the same rotational speed. In particular, the second bearing unit is in the form of a roller bearing, preferably a radial bearing or an oblique bearing.

As an optional supplement, the drive input section can comprise a further compensating coupling and/or a further torque sensor. The further compensating coupling and/or the further torque sensor is/are arranged between the second shaft and the drive output mechanism, so that in particular the drive output mechanism is coupled to the second shaft by way of the further compensating coupling. Preferably, the further torque sensor serves to detect the drive output torque.

In a first specific embodiment the drive input section and the drive output section are arranged one behind the other in the axial direction, with the clutch unit arranged in the axial direction between the drive input section and the drive output section. In particular, in the axial direction and viewed roughly, the drive output and drive output sections are made mirror-symmetrically, so that the first and second shafts preferably have a common rotational axis. Thus, as viewed in the axial direction the clutch unit is arranged between the first and the second shaft. Particularly preferably, both shafts are solid shafts. In particular, in the axial direction relative to the rotational axis the first and second disk carriers are counter-directional relative to one another. This type of arrangement is termed dual-sided or stranded.

In a further embodiment the drive output section comprises a carrier device. In particular the carrier device is in the form of a carrier dog, such that the second disk carrier can be coupled to or decoupled from the second shaft by means of the carrier device. In particular the carrier device has the function of transmitting a rotation movement or the drive output torque between the second shaft and the second disk carrier.

The first and the second disk carriers are associated with the drive input section and the carrier device is associated with the drive output section. The carrier device is preferably connected rotationally fixed to the second shaft. In particular, the first and second disk carriers are aligned in the axial direction relative to the rotational axis. This type of arrangement is termed single-side or single-ended since with this arrangement the first and the second disk carrier are accessible from one side.

In a second specific version the drive input section and the drive output section are arranged in the axial direction on the same side of the clutch unit. In particular the first and second disk carrier are supported on one side. Preferably, the two shafts are arranged with the same axial side on the corresponding disk carrier. This arrangement is also known as a single-side or single-ended arrangement.

In a design version of the invention the first shaft is a solid shaft and the second shaft is a hollow shaft, the two shafts being arranged coaxially with one another in particular relative to the rotational axis. The two shafts are a distance apart from one another in the radial direction, and the measuring unit is arranged between the first and the second shaft. In particular, the first shaft and/or the bearing block extend in the axial direction at least in part inside the second shaft, so that the bearing block is enclosed coaxially at least in part by the radially outer shaft, i.e. the second shaft. The second shaft can for example be mounted in the radial direction through the second bearing unit and/or the fluid bearing. Preferably, in the radial direction the second shaft is supported by the second bearing unit on a radially outer side of the bearing block and/or a radially inner side of the housing.

In a further embodiment of the invention the test bench arrangement comprises an actuating device for actuating the clutch unit. By means of the actuating device a force can be produced in the axial direction on the first and/or the second disk carrier, so that the clutch unit can be actuated and/or an air gap between the two disk carriers can be adjusted. The actuating device can be associated with the drive input section and/or the drive output section. Alternatively, the actuating device can be arranged on a side of the clutch unit opposite to the drive input section and/or the drive output section.

In a further specific embodiment of the invention, the actuating device comprises an actuator, a third bearing unit and a transfer element. The actuator is connected to the transfer element by way of the bearing unit, so that the actuator moves and/or acts upon the transfer element with an axial force in the axial direction, in particular relative to the rotational axis. Preferably the transfer element is in contact with the first or the second disk carrier, in particular on the inner or outer disks. By virtue of the movement of the transfer element in the axial direction the two disk carriers are pressed together so that the frictional connection between the outer disks and the inner disks is produced. Preferably, the actuator is in the form of a hydraulic cylinder or an electric motor with a threaded spindle, or an electric linear motor.

The third bearing unit is in the form of a roller bearing, preferably an axial bearing or an oblique bearing. Thanks to the additional mounting of the transfer element in a bearing, the transfer element can rotate in the rotational direction during operation, whereas the actuator does not rotate and is decoupled in the rotational direction.

In a further specific version of the invention the drive output section comprises a transmission device, with the transmission device drive-connected between the drive output mechanism and the second shaft. In particular the drive output mechanism is arranged axis-parallel to the second shaft, so that the drive output torque is transferred via the transmission device to the second shaft. Preferably, the transmission device is in the form of a traction drive, preferably a belt drive or a chain drive, or a friction-wheel drive or a gearwheel drive.

In an alternative specific embodiment the drive output mechanism is a hollow-shaft motor, wherein the second shaft is in the form of a drive input hollow shaft of the hollow-shaft motor. In particular the drive output mechanism is arranged coaxially and/or concentrically with the second shaft in relation to the rotational axis.

In a further development of the invention the test bench arrangement has a further measuring unit for detecting a second frictional torque of the second bearing unit. The second measuring unit is made in the same way as the first measuring unit. In particular, the drive output section contains the second measuring unit.

BRIEF DESCRIPTION OF THE DRAWINGS

Further features, advantages and effects of the invention emerge from the following description of preferred example embodiments of the invention. The figures show.

DETAILED DESCRIPTION OF THE PREFERRED EMBODIMENTS

In the figures, respective components that correspond to one another or are the same are given the same indexes.

Figure 1:
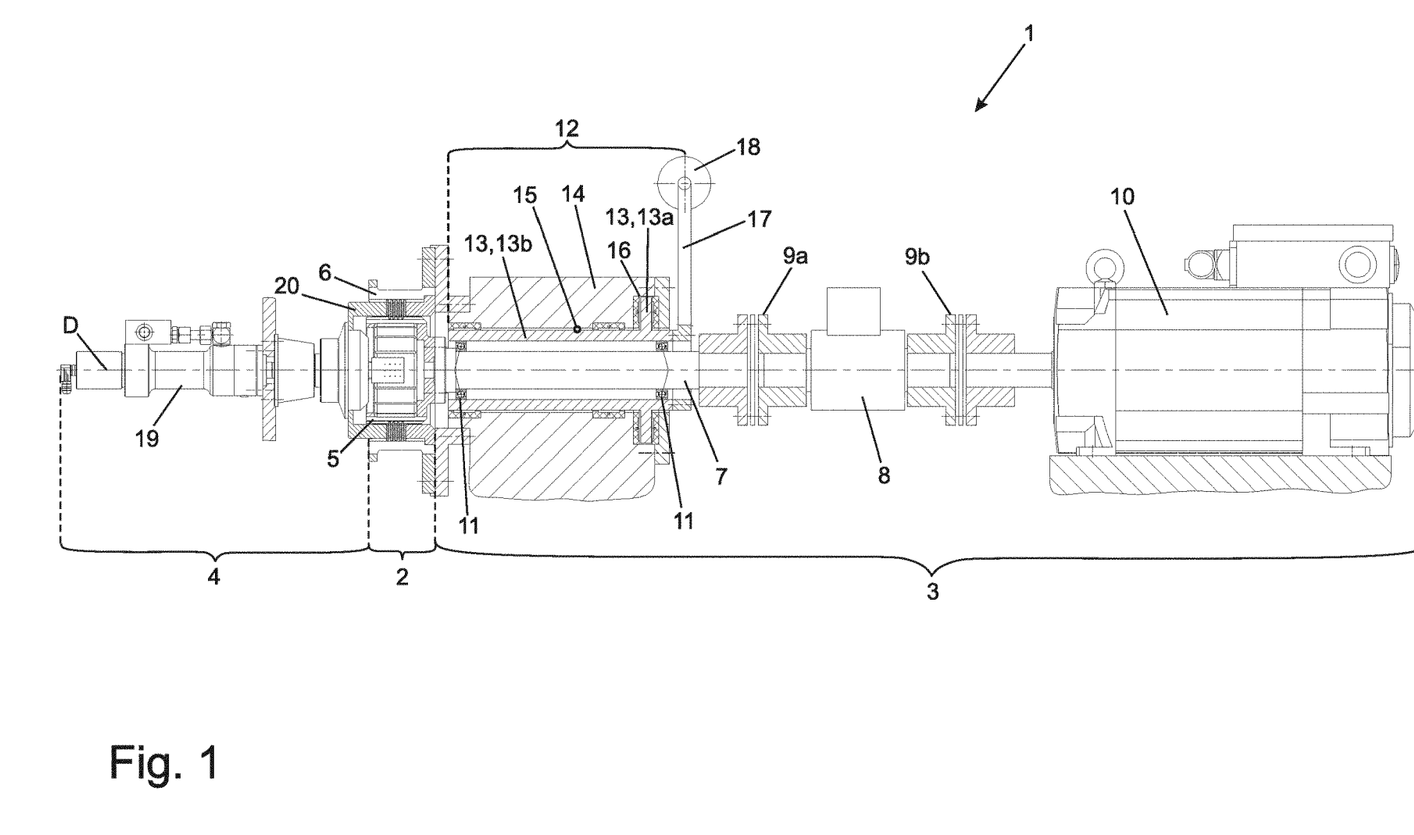
FIG. 1: A sectioned view of a test bench arrangement for testing a clutch unit, as a first example embodiment of the invention.

FIG. 1 shows a sectioned view of a test bench arrangement 1 with braking operation for testing a clutch unit 2, in particular a frictional multi-disk clutch with a disk set, as a first example embodiment of the invention.

Regardless of the embodiment variant, the test bench arrangement 1 according to the invention comprises a drive input section 3 for driving the clutch unit 2 and an actuating device 4 for actuating the clutch unit 2. The clutch unit 2 comprises a first disk carrier 5 and a second disk carrier 6. The first disk carrier 5 is an inner disk carrier and the second disk carrier 6 is an outer disk carrier. For example, the two disk carriers 5, 6 are arranged in a test chamber filled with oil. The two disk carriers 5, 6 are arranged coaxially and/or concentrically with one another in relation to a rotational axis D, and can move relative to one another in the axial direction and/or in the rotational direction.

In an open condition of the clutch unit 2, the first disk carrier 5 rotates in the idling mode about the rotational axis D, so that in particular an idling torque or drag torque is produced. Preferably, in a closed condition of the clutch unit 2 the two disk carriers 5, 6 are connected to one another in the rotational direction relative to the rotational axis D, in particular connected by friction force, whereby in particular a load torque is produced.

The drive input section 3 comprises a first shaft 7, a torque sensor 8, a first and a second compensating coupling 9a, 9b and a drive unit 10. For example, the drive unit 10 is in the form of an electric motor. The first shaft 7 is a solid shaft and is connected rotationally fixed to the first disk carrier 5. To drive the first disk carrier 5 the drive unit 10 is connected to the first shaft 7 by way of the two compensating couplings 9a, 9b and the torque sensor 8. The torque sensor 8 is arranged between the two compensating couplings 9a, 9b, whereas the two compensating couplings 9a, 9b serve to compensate any shaft displacement in the axial and/or radial direction.

In addition the drive input section comprises two roller bearings forming a first bearing unit 11. The two roller bearings serve to support the first shaft 7 and are arranged axially on the first shaft 7 one behind the other and positionally separate from one another in relation to the rotational axis D. For example, the two roller bearings are in the form of shoulder ball bearings.

The test bench arrangement 1 has a measuring unit 12 for the determination of a frictional torque of the first bearing unit 11. The measuring unit 12 comprises a hollow measuring shaft 13 and a bearing block 14 fixed on the housing, the hollow measuring shaft 13 being mounted by means of a fluid bearing 15. The hollow measuring shaft 13 is in the form of a hollow shaft with the first shaft 7 passing coaxially and/or concentrically through the hollow shaft at least in part. The first bearing unit 11 is supported with at least one inner ring on an outer circumference of the first shaft 7 and with at least one outer ring on an inner circumference of the hollow measuring shaft 13.

Between the bearing block 14 and the hollow measuring shaft there is formed a bearing gap in which a fluid film is produced, so that the fluid bearing 15 is formed. Preferably, the fluid bearing 15 is in the form of a hydrostatic or aerostatic slide bearing. The bearing block 14 is roughly of hollow-cylindrical shape. The hollow measuring shaft 13 has a flange section 13a and a cylindrical section 13b.

The bearing block 14 has a holding section 16, for example in the form of an annular groove or depression or recess. The flange section 13a is held in the holding section 16, so that the bearing gap is formed in the radial and/or axial direction and/or in the circumferential direction between the holding section 16 and the flange section 13a. The cylindrical section 13b extends in the axial direction within the bearing block 14, so that the bearing gap is formed in the rotational direction and/or in the axial direction between the radially outer side of the cylindrical section 13b and an inner surrounding surface of the bearing block 14. This therefore enables a radial and at the same time axial mounting of the hollow measuring shaft 13 relative to the rotational axis D.

The measuring unit 12 has a lever arm 17 and a sensor device 18. The lever arm 17 is connected rotationally fixed to the hollow measuring shaft 13 and in the rotational direction is supported against the sensor device 18, so that rotation of the hollow shaft 13 about the rotational axis D is prevented. During operation of the test bench arrangement 1 frictional torque of the first bearing unit 11 is transmitted to the hollow measuring shaft 13 and the lever arm 17. The lever arm 17 then transmits the frictional torque in the form of a force transfer to the sensor device 18, the sensor device 18 preferably being a force sensor. For example, by means of an evaluation device (not shown) the frictional torque can be determined with reference to the force detected.

By virtue of the friction-free mounting of the hollow measuring shaft 13 by the fluid bearing 15 at zero rotational speed, the bearing friction or frictional torque of the bearing units 11 can therefore be determined precisely. Thus even small torques such as the drag torque or the idling torque of the clutch unit 2, in particular that of the first disk carrier 5, can be determined with precision. For that purpose, for example, the frictional torque determined can be subtracted from the drive torque determined by the rotational speed sensor 8.

According to the first embodiment variant of the test bench arrangement 1 shown in FIG. 1, the second disk carrier 6 is arranged in a rotationally fixed manner and remains stationary during operation. For this, the second disk carrier 6 is connected rotationally fixed to the bearing block 14 so that during the closing process of the clutch unit 2 a braking operation is thus simulated. Furthermore the two disk carriers 5, 6 are aligned in the axial direction, so that the two disk carriers 5, 6 can be accessed from the same side. Among others, this type of arrangement is known as the single-ended configuration.

The actuating device 4 comprises an actuator 19 and a transfer element 20. The actuator 19 is for example in the form of a pneumatic or hydraulic linear drive, such that the actuator 19 displaces the transfer element 20 in an axial direction relative to the rotational axis D and/or acts upon it with an axial force. The transfer element 20 is orientated toward the two disk carriers 5, 6 and, for example, is in contact with the first or the second disk carrier 5, 6. During a closing process of the clutch unit 2, the two disk carriers 5, 6 are acted upon in the axial direction by the axial force, and are pressed together. During the closing process of the clutch unit 2 the second disk carrier 6 comes into contact with the first disk carrier 5 so that by virtue of the friction force between them the first disk carrier 5 is braked. For example, the actuating device 4 can comprise a force-path measuring cell for measuring the force and/or the path, this cell being arranged in the axial direction between the transfer element 8 and the actuator 7.

Figure 2:
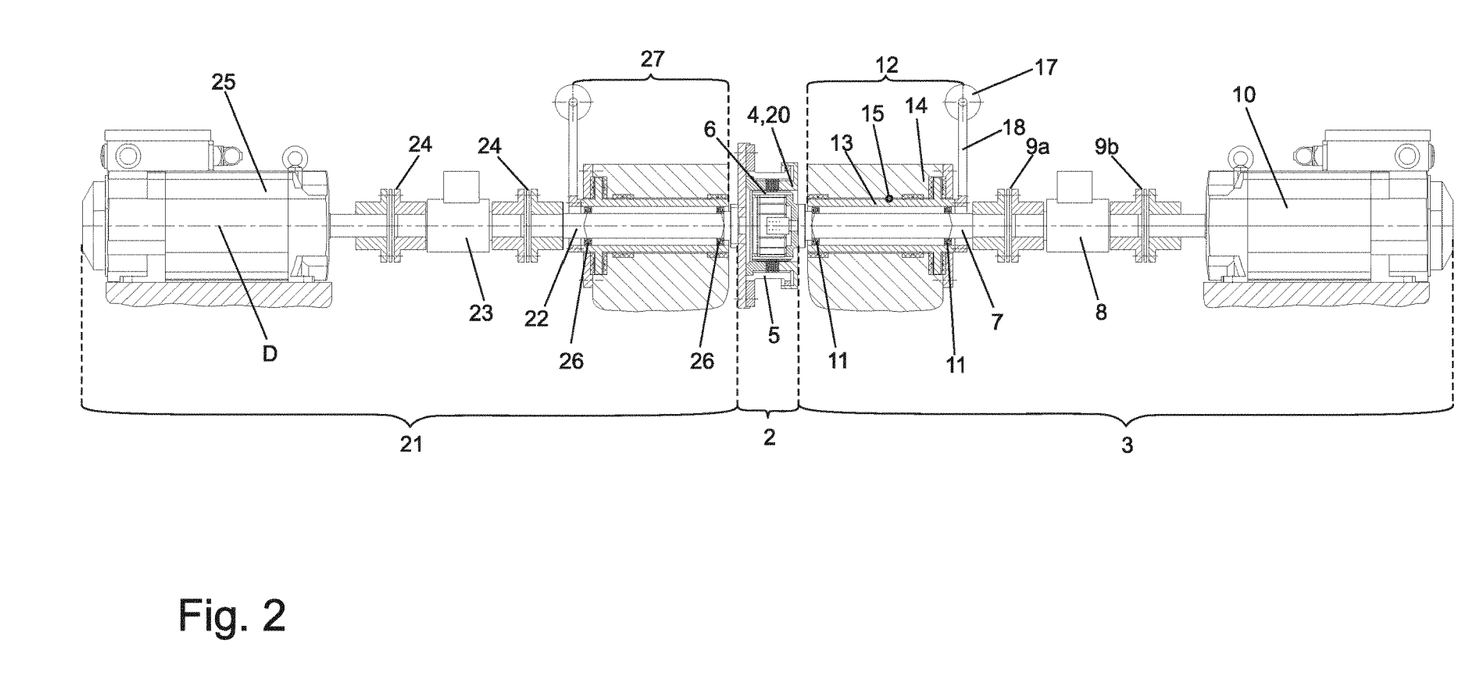
FIG. 2: A test bench arrangement shown in the same way as in FIG. 1, as a second example embodiment of the invention.

FIG. 2 shows a sectioned view of the test bench 1 with clutch operation, as a second example embodiment of the invention. The test bench arrangement 1 additionally comprises a drive output section 21, wherein the drive output section 21 is formed mirror-symmetrically to the drive input section 3. The drive output section 21 has a second shaft 22, a further torque sensor 23 and two further compensating couplings 24 and a drive output mechanism 25. For example, the drive output mechanism 25 is again an electric motor.

The clutch unit 2 is arranged in the axial direction between the drive input section 3 and the drive output section 21. In this second embodiment variant the two disk carriers 5, 6 are arranged counter-directionally, in such manner that the first shaft 7 is connected to the first disk carrier 5 and the second shaft 22 to the second disk carrier 6. This type of arrangement is known, among other things, as a strand configuration. The two shafts 7, 22 extend in the axial direction along the rotational axis D and are solid shafts. The drive output mechanism 25 is connected to the second shaft 22 by way of the two further compensating couplings 24 and the further torque sensor 23, and thus drives the second disk carrier 6 in the rotational direction about the rotational axis D.

The actuating device 4 comprises the transfer element 20, which as already described in FIG. 1 is designed to open and close the clutch unit 2. For example, the actuating device 4 can be actuated manually or by means of an actuator (not shown). Thus, during the closing process of the clutch unit 2 clutch operation is simulated, wherein the drive input mechanism 10 and the drive output mechanism 25 are synchronized to the same rotational speed.

The second shaft 22 is mounted to rotate by means of two further roller bearings forming a second bearing unit 26. To determine the friction torque of the second bearing unit 26 the test bench arrangement 1 comprises a further measuring unit 27, such that the further measuring unit 27 and the measuring unit 12 are structurally or functionally identical.

In an open condition of the clutch unit 2 the first and second disk carriers 5, 6 rotate in an idling mode about the rotational axis D, so that in particular the idling torque or drag torque is produced. During the closing process of the clutch unit 2 the second disk carrier 6 comes in contact with the first disk carrier 5, so that by friction force the two disk carriers 5, 6 are synchronized to the same rotational speed.

Figure 3:
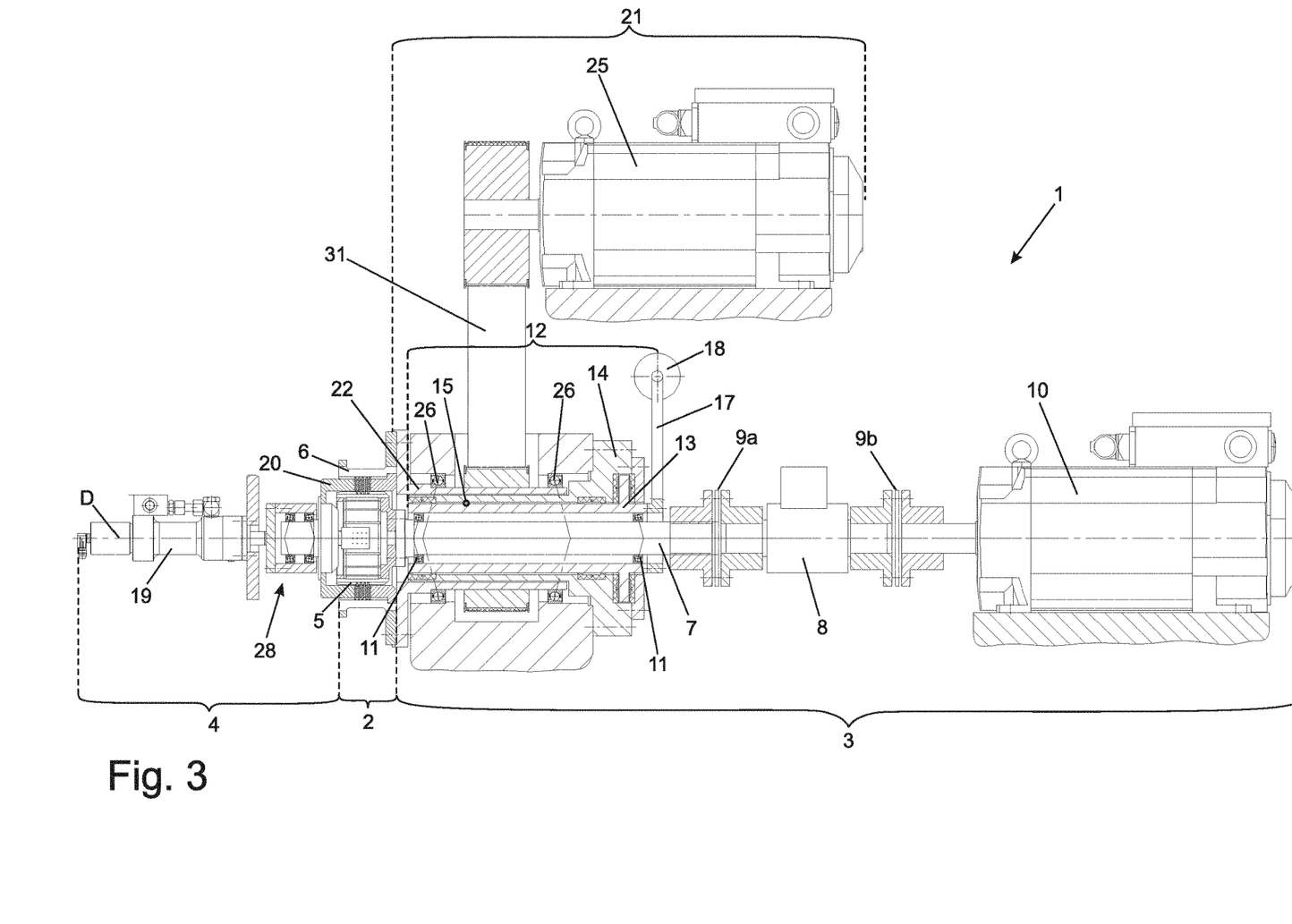
FIG. 3: A test bench arrangement shown in the same way as in FIG. 1, as a third example embodiment of the invention.

FIG. 3 shows a sectioned view of the test bench arrangement 1 with clutch operation, as a third example embodiment of the invention. According to this third embodiment variant, the drive input section 3 and the drive output section 21 are arranged on the same side of the clutch unit 2. For this, the second shaft 22 is made as a hollow shaft and the first shaft 7 and the measuring unit 12 extend at least in part coaxially and/or concentrically within the second shaft 22. Here, the second shaft 22 is mounted separately by means of the second bearing unit 26.

The two driven shafts 7, 22 are fixed on the same axial side to the respective disk carriers 5, 6, so that the so-termed single-ended structure is produced in the test bench arrangement 1. The drive motor 10 is arranged axially behind the first shaft 7 and the drive output mechanism 25, with its axis parallel to that of the second shaft 22. The drive output section 21 comprises a transmission device 31, this transmission device 31 being in the form of a belt drive. The second shaft 22, made as a hollow shaft, is connected to the drive output mechanism 25 by way of the transmission device 31.

The transfer element 20 of the actuating device 20 is associated with the side of the disk carriers 5, 6 facing away from the two shafts 7, 22. Since the two shafts 7, 22 face toward the disk carriers 5, 6 on the same axial side, the opposite side of the two disk carriers 5, 6 is available for actuation by the actuator 19.

The actuating device 4 comprises a third bearing unit 28, this third bearing unit 28 being arranged between the actuator 19 and the transfer element 20. For example, the third bearing unit 28 can be in the form of an axial bearing or an oblique bearing. Thus, by means of the bearing unit 28 the transfer element 20 can be moved in the axial direction by the actuator 19 while at the same time the transfer element 20 can rotate in the rotational direction relative to the rotational axis D.

Figure 4:
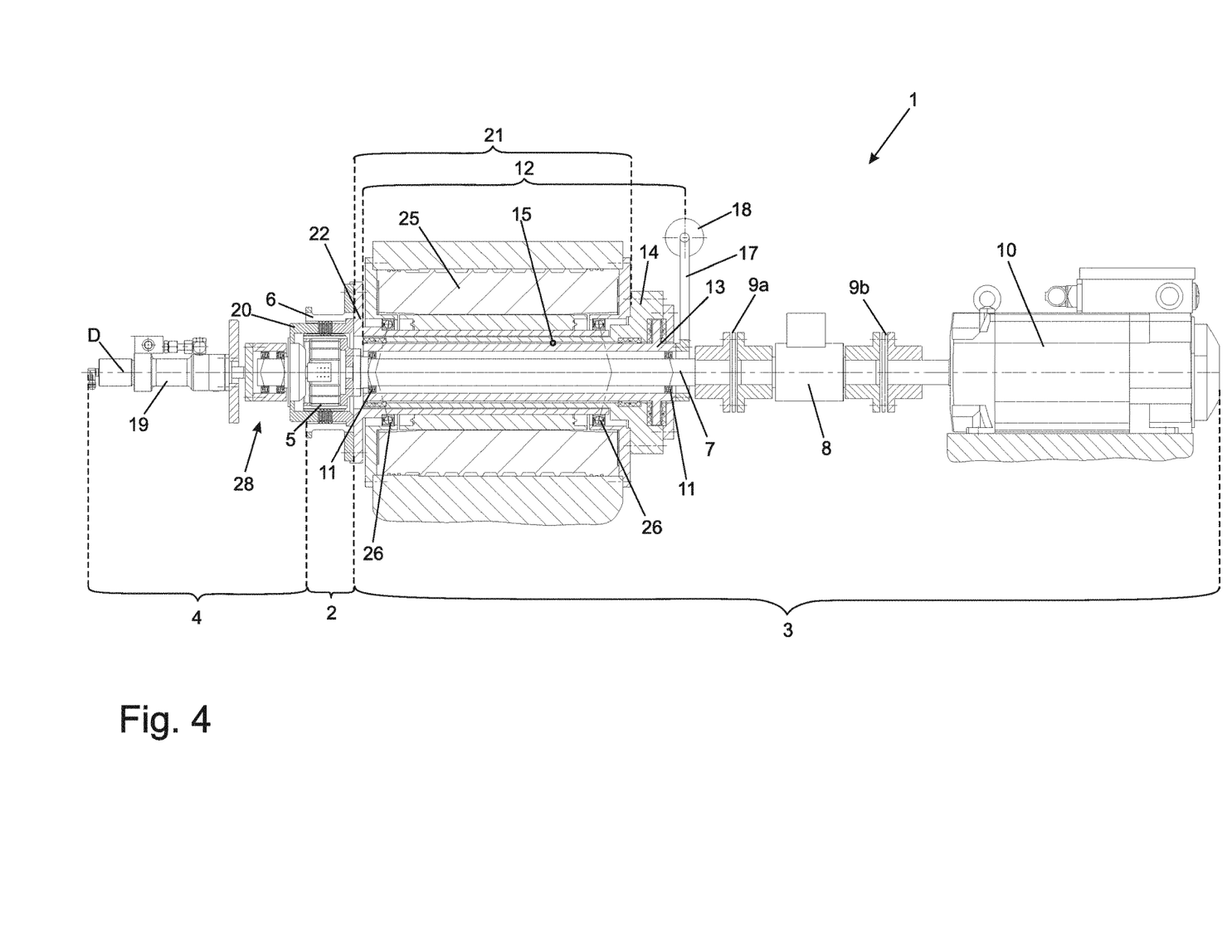
FIG. 4: A test bench arrangement shown in the same way as in FIG. 1, as a fourth example embodiment of the invention.

In a manner similar to FIG. 3, FIG. 4 shows the test bench arrangement 1 as a fourth example embodiment of the invention, wherein the drive output mechanism 25 is in the form of a hollow-shaft motor. The second shaft 22, which is a hollow shaft, serves in this case as a drive input hollow shaft of the hollow-shaft motor. The drive output mechanism 25 is arranged coaxially with the second shaft 22 in relation to the rotational axis D in such manner that the second shaft 22 is driven directly by the drive output mechanism 25, so that there is no need for the transmission device 31 shown in FIG. 3.

Figure 5:
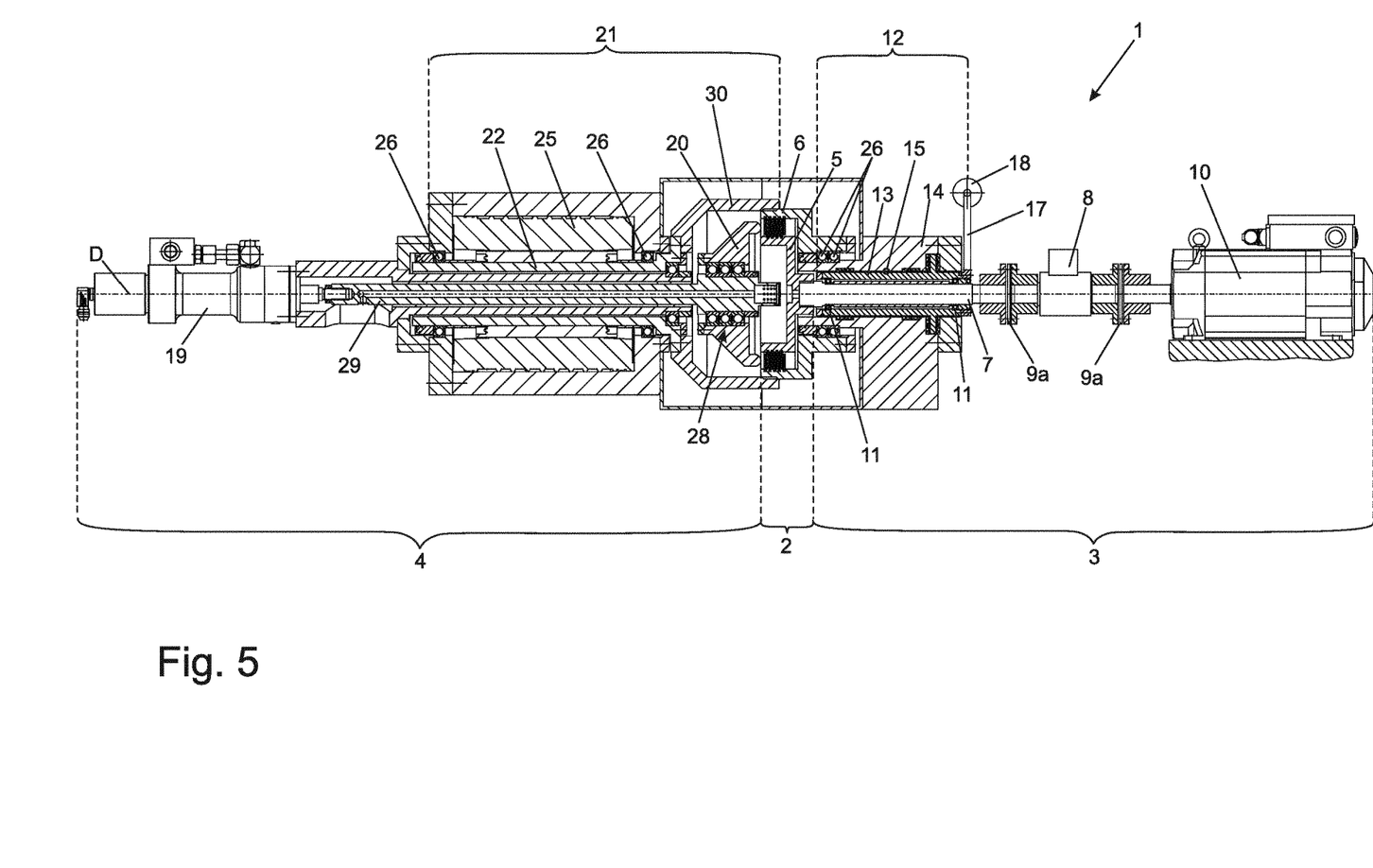
FIG. 5: A test bench arrangement shown in the same way as in FIG. 1, as a fifth example embodiment of the invention.

FIG. 5 shows a sectioned view of the test bench 1 as a fifth example embodiment of the invention. According to this fifth embodiment variant the clutch unit 2 is arranged between the drive input section 3 and the drive output section 21. The two disk carriers 5, 6 are aligned in the direction of the drive output section 21, so that the two disk carriers 5, 6 are associated with the drive input section 3. The first disk carrier 5 is connected to the first shaft 7. The second disk carrier 6 is mounted separately by the second bearing unit 26 in such manner that the second disk carrier 6 is supported by the second bearing unit 26 on the radially outer side of the bearing block 14.

On the side of the disk carriers 5, 6 facing away from the first shaft 7 are arranged the actuating device 4 and the drive output mechanism 25. The drive output mechanism 25 is in the form of the hollow-shaft motor and is arranged coaxially with the second shaft 22 in relation to the rotational axis D. The transfer element 20 is connected by means of a transfer rod 29 to the actuator 19. The transfer rod 29 passes through the second shaft 22, which is a hollow shaft. In this case the transfer element 20 is arranged at an axial end of the transfer rod 29 and is mounted to rotate by virtue of the third bearing unit 28.

In order to drive the second disk carrier 6 the drive output section 21 comprises a drive device 30, for example in the form of a carrier dog. The drive device 30 is connected rotationally fixed to the second shaft 22, so that by virtue of the drive device 30 the second disk carrier 6 can be coupled to or decoupled from the second shaft 22.

Although in this embodiment variant the drive output mechanism 10 and the drive output mechanism 25 are arranged on different sides of the clutch unit 2, despite this the test bench arrangement 1 consists of a single-ended structure since both disk carriers 5, 6 can be accessed from one side.

INDEXES

1 Test bench arrangement
2 Clutch unit
3 Drive input section
4 Actuating device
5 First disk carrier
6 Second disk carrier
7 First shaft
8 Torque sensor
9a First compensating coupling
9b Second compensating coupling
10 Drive input mechanism
11 First bearing unit
12 Measuring unit
13 Hollow measuring shaft
13a Cylindrical section #
13b Flange section #
14 Bearing block
15 Fluid bearing
16 Holding section
17 Lever arm
18 Sensor device
19 Actuator
20 Transfer element
21 Drive output section
22 Second shaft
23 Further torque sensor
24 Further compensating couplings
25 Drive output mechanism
26 Second bearing unit
27 Further measuring unit
28 Third bearing unit
29 Transfer rod
30 Drive device
31 Transmission device
D Rotational axis

The invention claimed is:

1. A test bench arrangement for testing a multi-disk clutch, the test bench arrangement comprising:
    a clutch unit, and the clutch unit comprising a first disk carrier and a second disk carrier,
    the first disk carrier being movable relative to the second disk carrier,
    a drive input section, and the drive input section comprising a drive mechanism that produces relative movement between the first and the second disk carriers,
    a driven first shaft,
    at least one first bearing unit for mounting the first shaft,
    the first disk carrier being drive-connected, via the first shaft, to the drive mechanism,
    the first shaft being mounted to rotate by virtue of the first bearing unit, and
    a measuring unit for determining a first frictional torque of the first bearing unit.

2. The test bench arrangement according to claim 1, wherein the measuring unit comprises a sensor device and a hollow measuring shaft arranged coaxially with the first shaft for transferring the first frictional torque from the bearing unit to the sensor device, and the hollow measuring shaft is mounted, on a first radial side, by the bearing unit and mounting, on a second radial side, by a fluid bearing.

3. The test bench arrangement according to claim 2, wherein the fluid bearing is in a form of either a hydrostatic slide bearing or an aerostatic slide bearing.

4. The test bench arrangement according to claim 2, wherein the hollow measuring shaft has a lever arm, the lever arm is supported against the sensor device in a rotational direction about a rotational axis such that rotation of the hollow measuring shaft, in the rotational direction, is impeded and the first frictional torque is transmittable to the sensor device.

5. The test bench arrangement according to claim 1, wherein the second disk carrier is fixed in a stationary position such that when the clutch unit is actuated, a braking operation can be simulated.

6. The test bench arrangement according to claim 1, the test bench arrangement further comprises a drive output section, the drive output section comprises a drive output mechanism, a driven second shaft and at least one second bearing unit for mounting the second shaft, the second disk carrier is drivingly connectable, via the second shaft, to the drive output mechanism, the second shaft is mounted to rotate by virtue of the second bearing unit, and when the clutch unit is actuated, a clutch operation can be simulated.

7. The test bench arrangement according to claim 6, wherein the drive input section and the drive output section are arranged, one behind the other, in an axial direction, and the clutch unit is arranged in the axial direction between the drive input section and the drive output section.

8. The test bench arrangement according to claim 6, wherein the drive output section comprises a carrier device, the second disk carrier is either couplable to or decouplable from the second shaft, via the carrier device, and the drive output section is associated with the first and the second disk carriers.

9. The test bench arrangement according to claim 6, wherein the drive input section and the drive output section are arranged in an axial direction on a same side of the clutch unit.

10. The test bench arrangement according to claim 9, wherein the first shaft is a solid shaft and the second shaft is a hollow shaft, the first and the second shafts are arranged coaxially with one another, and the measuring unit is arranged in a radial direction between the first and the second shafts.

11. The test bench arrangement according to claim 1, wherein the test bench arrangement comprises an actuating device for actuating the clutch unit such that, by the actuating device, a force in an axial direction can be exerted on at least one of the first and the second disk carriers so that the clutch unit is actuatable and an air gap between the two disk carriers is adjustable.

12. The test bench arrangement according to claim 11, wherein the actuating device comprises an actuator, a third bearing unit and a transfer element, the third bearing unit is arranged between the actuator and the transfer element so that the transfer element is mounted in a rotational direction.

13. The test bench arrangement according to claim 6, wherein the drive output section comprises a transmission device and the second shaft is drive-connected to the drive output mechanism by way of the transmission device.

14. The test bench arrangement according to claim 6, wherein the drive output mechanism is in a form of a hollow-shaft motor, and the second shaft is a drive input hollow shaft of the hollow-shaft motor.

15. The test bench arrangement according to claim 6, wherein the test bench arrangement comprises a further measuring unit for determining a second frictional torque of the second bearing unit.

16. A test bench arrangement for testing a multi-disk clutch, the test bench arrangement comprising:
- a clutch unit having a first disk carrier and a second disk carrier, and the first disk carrier being rotatable relative to the second disk carrier;
- a drive input section having a first driven shaft, the first disk carrier being rotationally fixed to the first driven shaft, the first driven shaft being rotatably supported by a first bearing unit, a drive mechanism being drivingly connected to the first driven shaft to rotationally drive the first disk carrier relative to the second disk carrier; and
- a measuring unit for determining a first frictional torque of the first bearing unit.

\* \* \* \* \*